United States Patent [19]

Shipaev et al.

[11] 4,388,569
[45] Jun. 14, 1983

[54] SYSTEM FOR AUTOMATIC CONTROL OF DYNAMIC BRAKING OF INDEPENDENT TRANSPORT FACILITY

[76] Inventors: Gennady A. Shipaev, ulitsa Magnitogorskaya, 27, kv. 96; Vyacheslav V. Seliverstov, 2 Dorozhny proezd, 16, korpus 1, kv. 67; Nikolai A. Osipov, ulitsa Tkatskaya, 28/14, kv. 116; Anatoly P. Prolygin, ulitsa Trofimova, 2/1, kv. 130; Anatoly D. Mashikhin, ulitsa Marshala Timoshenko, 28, kv. 45; Mikhail P. Askinazi, ulitsa Trifonovskaya, 60, korpus 2, kv. 73; Jury M. Andreev, Nagatinskaya ulitsa 15, korpus, 1, kv. 53, all of Moscow; Samuil I. Kagan, ulitsa 40 let Oktyabrya, 31, kv. 62, Zhodino, Minskaya oblast, all of U.S.S.R.

[21] Appl. No.: 307,944

[22] Filed: Sep. 24, 1981

[51] Int. Cl.³ .............................................. H01P 3/00
[52] U.S. Cl. ...................................... 318/87; 318/269; 318/273; 318/375
[58] Field of Search ....................... 318/86, 87, 88, 89, 318/269, 273, 375, 380, 376

[56] References Cited

U.S. PATENT DOCUMENTS

| 3,651,388 | 3/1972 | Machin, Jr. et al. | 318/88 |
| 4,103,211 | 7/1978 | Gardner et al. | 318/87 |
| 4,196,377 | 4/1980 | Boxer | 318/269 |
| 4,243,919 | 1/1981 | Brown | 318/269 |
| 4,295,086 | 10/1981 | Cutler et al. | 318/375 X |

Primary Examiner—Ulysses Weldon
Attorney, Agent, or Firm—Myron Greenspan

[57] ABSTRACT

A system for automatic control of dynamic braking of an independent transport facility comprises an exciting-current regulator of traction motors provided with rotational-speed transducers whose outputs are connected to the input of a traction-motor reactive e.m.f. limiter, and a voltage transducer whose output is coupled to the first input of a traction-motor exciting-current and brake-horse-power limiter formed with three interconnected rectifying bridges, the outputs of the two bridges being connected in accord and coupled to the output of the third bridge and to one input of a comparison unit, while the inputs thereof are connected to an exciting-current transducer and to a braking intensity setter, the second input of the comparison unit being connected through a diode to the traction-motor reactive e.m.f. limiter.

4 Claims, 3 Drawing Figures

SYSTEM FOR AUTOMATIC CONTROL OF DYNAMIC BRAKING OF INDEPENDENT TRANSPORT FACILITY

FIELD OF THE INVENTION

The present invention relates to control of traction motors and in particular to systems for automatic control of dynamic braking of an independent transport facility.

The invention may be used in electric rolling stock (transport) for obtaining desired deceleration characteristics in dynamic braking of traction motors.

PRIOR ART

Mechanical, hydraulic and hydromechanical transmissions of independent transport facilities are being currently replaced by DC, DC/AC and AC traction drives in industrially developed countries throughout the world.

The DC and DC/AC traction drives utilize various systems for automatic control of dynamic braking of an independent transport facility.

A known system for automatic control of dynamic braking of a transport facility (cf. A. D. Stepanov and N. A. Pogarsky "Universal Transmissions of Pneumatic Wheeled Vehicles Having Increased Unit Power", Mashinostroenye, Moscow, 1976, in Russian) comprises a DC traction generator whose output is coupled through braking contactors to parallel-connected field windings of traction motors with current-limiting resistors and to the coil of a generator overload relay placed in series therewith. Braking resistors are connected to the armatures of the traction motors through the braking contactors. The field winding of the traction generator is connected to an exciter. One lead of the field winding of the exciter is connected via a contactor to the anode bus of a rectifier and to the first resistor, while the other lead thereof is connected through a contactor to the negative terminal of a storage battery. The first resistor is connected to the diode cathode and to the second resistor. The second resistor is connected to the cathode bus of the bridge. The bridge is operated from a synchronous generator. The diode is connected to the positive terminal of the storage battery over a circuit incorporating the third resistor, fourth resistor and a controller, the fourth resistor being bypassed by breaking contacts of the generator overload relay.

The traction generator, exciter and the synchronous generator are mechanically coupled to the shaft of the diesel engine. The controller is mechanically coupled to a brake pedal.

The controller position is changed as the turn angle of the brake pedal increases. Each position of the controller is conditioned by corresponding exciting currents of the exciter, traction generator and traction motors, i.e. by a respective braking characteristic.

To limit the voltage across the armature windings of the traction motors at high rotational speeds of the diesel engine, use is made of voltage feedback of the synchronous generator whose excitation remains essentially constant.

An increase in rotational speed of the diesel engine causes the voltage of the synchronous generator to rise. This voltage is rectified by the bridge and affects the exciting circuit of the exciter so that, with its rise, the exciting current of the exciter decreases. As a result, the voltage across the armature windings of the traction motors does not exceed a permissible maximum value.

With such a system, the generator overload relay is used to limit maximum permissible exciting current of the traction motors. When the exciting current reaches a maximum permissible value, the generator overload relay operates whereby its contacts break bypassing the fourth resistor in the excitation circuit of the exciter. The exciting current in the excitation circuit of the exciter decreases causing a corresponding decrease in the exciting current of the traction motors.

Disadvantages of the aforesaid automatic control system are discreteness in setting braking characteristics, an intricate alignment procedure, and difficulties involved in limiting the exciting current and voltage of the traction motors.

Furthermore, the known system includes no means for limiting a reactive e.m.f. of the traction motors.

Also known in the art is a system for automatic control of dynamic braking of an independent transport facility (cf. T. F. Kuznetsov, V. I. Lipovka et al "AC/DC Drives of Diesel Locomotives", Transport, Moscow, 1978, in Russian) comprising a traction synchronous generator with a field winding.

Placed at the output of the traction generator is a rectifying bridge having field windings of traction motors and an exciting-current transducer connected in series therewith through a current-limiting resistor. The start leads of the armature windings of the traction motors are connected to braking resistors which are placed in series, while the finish leads of the armature windings are combined at a common point. A sum armature current transducer is inserted between the common point of the armature windings and the common point of the braking resistors. The field winding of the traction generator is connected to a thyristor excitation regulator which is operated from an exciter. The thyristor excitation regulator is controlled by an excitation control unit whose input accepts a signal from the control system. The control system receives signals from the traction-motor exciting-current transducer, from the traction-motor sum-armature-current transducer and from a braking controller. The traction generator and the exciter drive the diesel engine.

Advantages of the foregoing system are a constant exciting current of traction motors, an essentially constant braking force, and a practically invariable brake-horsepower. A reactive e.m.f. is limited by the use of vanishing feedback which retards an increase of armature current of traction motors at high speeds of the transport facility. Partial braking characteristics are set discretely by turning the controller handle.

Limitations of the aforesaid system are discreteness in setting partial characteristics, an intricate alignment procedure, and imperfect functioning of the reactive e.m.f. limiter.

Also known in the art is a device for dynamic braking of DC motors comprising an exciting-current regulator of DC traction motors provided with rotational-speed transducers whose outputs are connected to the input of a traction-motor reactive e.m.f. limiter, a voltage transducer whose output is coupled to one of the inputs of an OR gate whose other input is connected to the input of an adder, the inputs of which are, respectively, connected to the traction-motor exciting-current transducer and to a braking intensity setter, a comparison unit having its one input connected to the output of the OR gate, its other input connected to the setter and the output thereof coupled to the input of the exciting-current regulator (cf. USSR Inventor's Certificate No. 647,321, Cl. H02P 3/12, filed Feb. 15, 1979).

The aforesaid system has been open to the objection because of low reliability, a disadvantage associated with the use of a contact method in changing from one control mode to another. Other limitations of the prior art system are the utilization of a contact element to perform the function of a braking intensity setter, and an intricate motor reactive e.m.f. limiter.

SUMMARY OF THE INVENTION

It is an object of the present invention to provide a system for automatic control of dynamic braking of DC traction motors, which permits changing from one control mode to another by the use of a non-contact method.

Another object of the invention is to enhance operational reliability of a system for automatic control of dynamic braking of DC traction motors.

The foregoing objects are accomplished by that in a system for automatic control of dynamic braking of an independent transport facility comprising an exciting-current regulator associated with traction motors provided with rotational-speed transducers whose outputs are connected to the input of a traction-motor reactive e.m.f. limiter, and a voltage transducer whose output is coupled to a first input of a DC-motor exciting-current and brake-horsepower limiter, a second input of said DC-motor exciting-current and brake-horsepower limiter being connected to an exciting-current transducer, while a third input thereof is connected to a braking intensity setter, according to the invention, the DC-motor exciting-current and brake-horsepower limiter is formed with three interconnected rectifying bridges, outputs of the two rectifying bridges being connected in series and coupled to the output of the third bridge and to one input of a comparison unit whose second input is connected through a diode to the traction-motor reactive e.m.f. limiter.

Advantageously the traction-motor reactive e.m.f. limiter employs diode bridges forming two parallel groups, each of which includes two diode bridges connected in parallel, series-connected resistors being preferably placed in parallel with the groups of the diode bridges, a center tap of said resistors being connected to a common point of each group.

Such circuit configuration increases reliability of the system since it permits obtaining a constant exciting current of traction motors up to a certain speed, a constant brake horsepower thereafter, and, beginning with a preset speed, limitation of a reactive e.m.f. by the use of a non-contact method.

Preferably, the system for automatic control of dynamic braking of an independent transport facility includes a speed stabilizer comprising a speed setter and three rectifying bridges connected in series, the two rectifying bridges being connected to traction-motor rotational-speed transducers, while the third rectifying bridge is connected to the speed setter, a resistor being incorporated in the output circuit of said rectifying bridges, a center tap of said resistor and a common point of said rectifying bridges being connected to the input of the comparison unit through a diode.

Such an arrangement enhances reliability of the entire system and makes its operation easy, an advantage attributed to the fact that a desired travelling speed may be obtained as the independent transport facility moves on a descending variable-profile road over a long time period.

BRIEF DESCRIPTION OF DRAWINGS

The invention will now be described further with reference to specific embodiments thereof, taken in conjunction with the accompanying drawings, wherein.

DETAILED DESCRIPTION OF THE INVENTION

Figure 1:
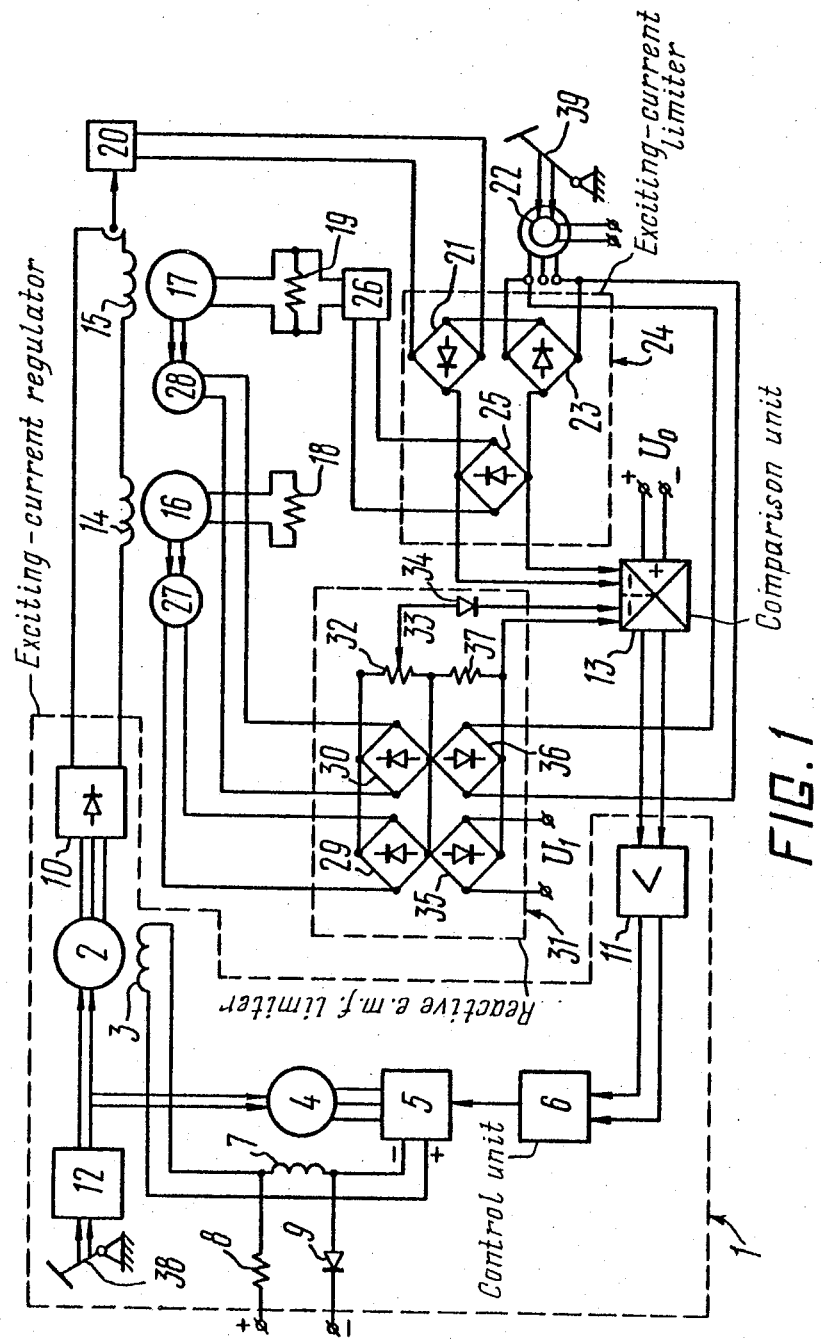
FIG. 1 is a schematic diagram of a system for automatic control of dynamic braking of an independent transport facility according to the invention.

The system for automatic control of dynamic braking of an independent transport means in compliance with the invention comprises an exciting-current regulator 1 (FIG. 1) incorporating a traction synchronous generator 2 with a field winding 3. The exciting-current regulator 1 also includes a house generator 4 having a controllable rectifying bridge 5 and a control unit 6 at its output. A field winding 7 of the house generator 4 placed in series with the field winding 3 of the traction synchronous generator 2 uses a self-excitation circuit and is coupled to a storage battery through a limiting resistor 8 and a cuttoff diode 9. Placed at the output of the traction synchronous generator 2 is a rectifying bridge 10, whereas an amplifier 11 is connected to the input of the control unit. The traction synchronous generator 2 and the house generator 4 have technical relation to a diesel engine 12. A comparison unit 13 is connected to the input of the amplifier 11 of the exciting-current regulator 1, while the output of the rectifying bridge 10 is coupled to series-connected field windings 14 and 15 of the traction motors, whose armatures 16 and 17 are connected to braking resistors 18 and 19. A traction-motor exciting-current transducer 20 is connected to a rectifying bridge 21, while a braking intensity setter 22 is coupled to a rectifying bridge 23, the rectifying bridges 21 and 23 being connected in series and serving as elements of a traction-motor exciting-current and brake-horsepower limiter 24.

A third rectifying bridge 25 of the traction-motor exciting-current and brake-horsepower limiter 24 is coupled to a voltage transducer 26 and also to series-connected rectifying bridges 21, 23 and to one input of the comparison unit 13.

Traction-motor rotational-speed transducers 27 and 28 are coupled to one pair of parallel-connected diode bridges 29, 30 of a reactive e.m.f. limiter 31 is connected to a resistor 32 whose slider 33 is coupled to the other input of the comparison unit 13 through a diode 34.

The second pair of parallel-connected diode bridges 35, 36 of the reactive e.m.f. limiter 31 is coupled to a regulator voltage source $U_1$ and also to the braking intensity setter 22, to a resistor 37 and to the second input of the comparison unit 13. The resistors 32 and 37 are placed in series, and their common tap is connected to a common point of the diode bridges 29, 30 and 35, 36 connected in parallel.

The system for automatic control of dynamic braking of an independent transport facility forming the subject of the present invention also includes a diesel-engine control pedal 38 and a brake pedal 39.

Referring to FIG. 1 the illustrated system for automatic control of dynamic braking of an independent transport facility operates in the following manner.

A signal $U_2$ proportional to the exciting current of the traction motors is fed from the current transducer 20 to the rectifying bridge 21 placed in series with the rectifying bridge 23. The rectifying bridge 23 is operated from the braking intensity setter. The braking intensity setter 22 may represent a synchro whose rotor is mechanically coupled to the brake pedal 39.

The sum signal $U_2+U_3=U_4$ (where $U_2$ is the signal proportional to the exciting current of the traction motors, $U_3$ is the signal picked off from the braking intensity setter 22, and $U_4$ is the control signal) is taken from the rectifying bridges 21 and 23 and applied to the input of the comparison unit 13. The signal $U_4$ is compared with a constant driving signal $U_0$.

An error signal $\Delta U$ is amplified by the amplifier 11 and fed to the control unit 6 of the rectifying bridge 5 coupled to the series-connected field windings 3 and 7 of the synchronous generator 2 and the house generator 4, respectively.

With the pedal 39 of the transport facility depressed up to the stop, the signal coming from the braking intensity setter 22 equals zero and the input of the comparison unit 13 accepts a control signal proportional to maximum exciting current $U_2+0=U_4$, which is compared with the driving signal $U_0$:

$$U_2=U_0$$

In this case, the automatic control system according to the invention will maintain maximum exciting current $I_{max}$. The voltage at the braking resistor (0A in FIG. 2) will correspond to said signal. At point A the signal from the voltage transducer 26 equals the signal from the exciting-current transducer 20. When the travelling speed of the independent transport facility exceeds $V_1$, the signal from the voltage transducer 26 exceeds the signal from the exciting-current transducer 20. This closes the rectifying bridge 21 and feeds a signal proportional to voltage $U_5$ to the comparison unit 13.

The hereinproposed automatic control system maintains a maximum voltage at the braking resistors 18 and 19. Inasmuch as the value of the braking resistors 18 and 19 remains constant, the automatic control system limits brake horsepower in the section AB. Beginning with the speed $V_1$ the exciting current decreases in a monotone manner as the speed increases.

The reactive e.m.f. limiter 31 operates at point B since at this point a maximum signal proportional to the rotational speed of the traction motors and picked off from the parallel-connected bridges 29, 30 exceeds the signal from the bridge 35 operating on the stable setting voltage $U_1$. Thus, the diode 34 is rendered conductive and the second input of the comparison unit 13 receives a signal fed in opposition to the signal $U_0$. As the speed increases from $V_2$ to $V_3$ (FIG. 2), the error voltage $\Delta U$ will rise whereby the exciting current of the synchronous generator 2 (FIG. 1) decreases, and the output voltage of the rectifying bridge 10 and the exciting current of the traction motors are also reduced. The output voltage $U_R$ of the traction motors will drop (straight line BC in FIG. 2).

Hence, with the brake pedal 39 depressed up to the stop, the automatic control system forms ultimate braking characteristic 0ABC in the section 0A with exciting-current limitation, in the section AB with maximum brake-horsepower limitation, and in the section BC with limitation imposed on a traction-motor reactance e.m.f.

Figure 2:
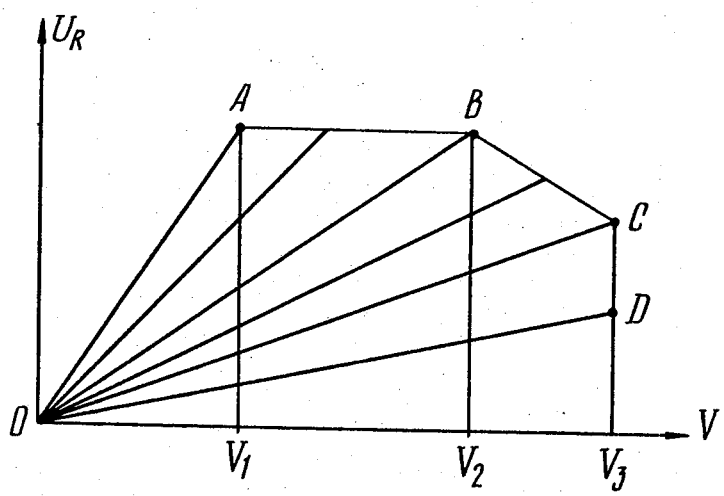
FIG. 2 presents static characteristics of a traction electric drive formed by the automatic control system according to the invention.

In addition to the ultimate characteristic 0ABC, the driver of the independent transport facility may depress the pedal 39 (FIG. 1) to form partial characteristics representing rays within the ultimate characteristic (FIG. 2). This will be done by setting the pedal 39 to an intermediate position. In this case, the braking intensity setter 22 (FIG. 1) will furnish a signal other than zero. Said signal is rectified by the bridge 23 and added to the signal proportional to the exciting current. The sum signal $U_3+U_2$ is fed to the comparison unit 13 wherein it is compared with the driving signal $U_0$:

$$U_3+U_2=U_0 \text{ or } U_2=U_0-U_3$$

Referring to the above formula it is apparent that the driving signal is reduced by an amount equal to the braking intensity signal. Thus, the automatic control system will maintain a constant exciting current at a level smaller than a maximum permissible current. Stated differently, the rays 0A, 0B, 0C and 0D (FIG. 2) will be formed.

In the area where the beam characteristics 0AB are formed the signal of the braking intensity setter 22 (FIG. 1) picked off from the bridge 36 is smaller than the setting signal $U_1$. So, it will not affect the above characteristics. In the area where the beam characteristics 0BCA (FIG. 2) are formed the signal picked off from the bridge 36 (FIG. 1) exceeds the setting signal. Thus, the diode 34 (FIG. 1) will conduct at higher speeds. The reactive e.m.f. is limited as soon as the straight line BC (FIG. 2) is reached.

However, in certain instances, say, with the independent transport facility moving on a descending variable-profile road over a long time period, it is essential that a medium speed of the transport facility should be maintained without the driver's intervention.

Figure 3:
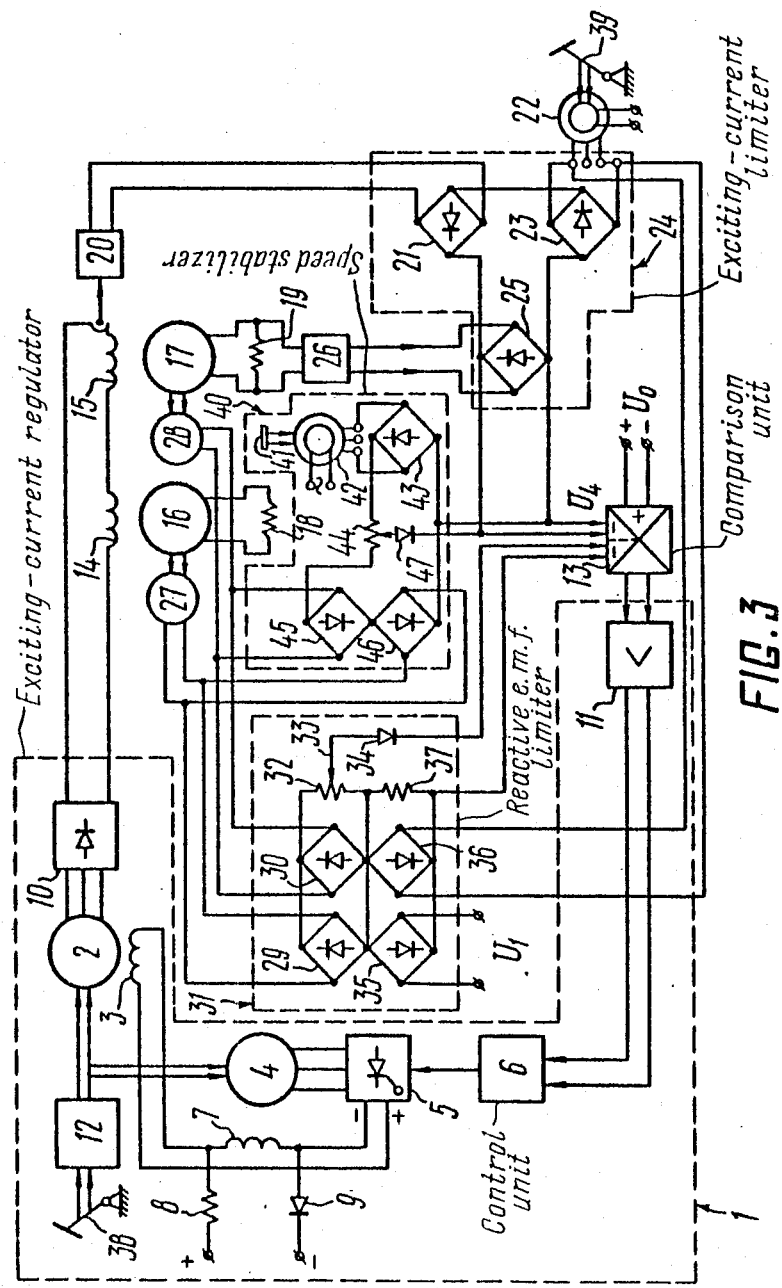
FIG. 3 illustrates another embodiment of the system for automatic control of dynamic braking of an independent transport facility with a speed stabilizer according to the invention.

For the above purpose, the automatic control system illustrated in FIG. 1 is provided with a speed stabilizer 40 (FIG. 3). The speed stabilizer 40 includes a handle 41 for setting a desired speed, said handle being part of a non-contact speed setter 42. The output of the speed setter 42 is connected to a rectifying bridge 43. The output of the rectifying bridge 43 is connected through a resistor 44 to the output of two series-connected bridges 45 and 46 whose inputs are coupled to the traction-motor rotational-speed transducers 27 and 28. Connected to the first input of the comparison unit 13 is the centre tap of the resistor 44 (coupled via a diode 47) and a common connection point of rectifying bridges 43 and 46.

The system for automatic control of dynamic braking of an independent transport facility illustrated in FIG. 3 operates in the following manner.

In addition to the formed braking characteristics described above, the automatic control system maintains a medium speed of the transport facility at a constant level. A desired speed is set by the handle 41 of the non-contact speed setter 42. The driver will turn the handle 41 to set a desired speed, say $V_2$. As this happens, the non-contact speed setter 42 furnishes the signal $U_2$ corresponding to the desired speed. This signal is rectified by the bridge 43 placed in series with the rectifying bridges 45 and 46, which operate from the traction-motor rotational-speed transducers 27 and 28. The bridges 43, 45 and 46 are loaded into the resistor 44. A control signal is fed to the input of the comparison unit 13 from the centre tap of said resistor through the diode 47 and from the common connection point of the rectifying bridges 43 and 46. Said signal is equal to a differential signal $$U_4 = U_{V_2} - (U_{W_1} + U_{W_2})$$

where
- $U_4$ is the control signal;
- $U_{V_2}$ is the signal furnished by the speed setter 42;
- $U_{W_1}$, $U_{W_2}$ are the signals furnished by the traction-motor rotational-speed transducers 27, 28.

From the above discussion it is apparent that the hereinproposed automatic control system will maintain a medium speed of an independent transport facility at a constant level. If the speed increases, the signal ($U_{W_1} + U_{W_2}$) will rise whereby the control signal $U_4$ will decrease and the error signal $\Delta U = U_0 - U_4$ will increase. This error signal is amplified by the amplifier 11 and affects the control unit 6 through the controllable rectifying bridge 5 so that the exciting current of the traction motors increases until said signal equals the preset signal. Stated differently, brake horsepower increases until the travelling speed equals the preset speed and vice versa. So, it is obvious that the speed of a transport facility will be maintained at a constant level with an accuracy comparable to a static system.

By operating the setter 42 to change the speed stabilization level the driver is capable of maintaining a desired speed of a transport facility, say, $V_1$, $V_2$, $V_3$ and so forth.

So, the driver may set any desired speed of his transport facility depending on the road profile and slope.

The preferred embodiments whose circuitry has been discussed above substantially simplify the system for automatic control of dynamic braking of an independent transport facility, enhance reliability and save time in alignment of an electric drive. Also, provision of a speed stabilizer in the automatic control system makes fatigue and stress lesser evils and seves lavour in long descents.

What is claimed is:

1. A system for automatic control of dynamic braking of an independent transport facility comprising: traction motors with field windings; a traction-motor exciting-current regulator whose output is connected to said field windings of said traction motors; rotational-speed transducers associated with said traction motors; a traction-motor reactive e.m.f. limiter whose input is coupled to the output of said rotational-speed transducer; a voltage transducer associated with at least one of said traction motors; an exciting-current transducer of associated with at least one said traction motors; a traction-motor exciting-current and brake-horsepower limiter formed with at least a first set of three interconnected rectifying bridges, outputs of two of said first set of rectifying bridges being connected in series and connected to the output of the third of said first set of rectifying bridge; a first input of said traction-motor exciting-current and brake-horsepower limiter being coupled to the output of said voltage transducer; while a second input thereof is connected to said exciting-current transducer; a braking intensity setter connected to a third input of said traction-motor exciting-current and brake-horsepower limiter; a comparison unit having its first input connected to the output of said traction-motor exciting-current and brake-horsepower limiter and its second input coupled through a diode to said traction-motor reactive e.m.f. limiter, the output of the comparison unit being connected to the input of said traction-motor exciting-current regulator.

2. A system for automatic control of dynamic braking of an independent transport facility as claimed in claim 1, wherein said traction-motor reactive e.m.f. limiter employs diode bridges forming two parallel groups, each of which includes two diode bridges connected in parallel, series-connected resistors being placed in parallel with said groups of the diode bridges, a center tap of said resistors being connected to a common point of each said group.

3. A system for automatic control of dynamic braking of an independent transport facility as claimed in claim 1, which includes a speed stabilizer incorporating a non-contact speed setter and a second set of three rectifying bridges connected in series, two of said second set of rectifying bridges being connected to said rotational-speed transducers, while said third rectifying bridge of said second set is connected to the non-contact speed setter, a resistor being incorporated in the output circuit of said second set of rectifying bridges, a center tap of said resistor connected through a diode and a common point of said second set of rectifying bridges being connected to the input of said comparison unit.

4. A system for automatic control of dynamic braking of an independent transport facility as claimed in claim 2, which includes a speed stabilizer incorporating a non-contact speed setter and a second set of three rectifying bridges connected in series, two of said second set of rectifying bridges being connected to said rotational-speed transducers, while the third rectifying bridge of said second set is coupled to the non-contact speed setter, a resistor being incorporated in the output circuit of said second set of rectifying bridges, a center tap of said second set of resistor connected through a diode and a common point of said rectifying bridges being connected to the input of said comparison unit.

* * * * *